(12) United States Patent
Shin et al.

(10) Patent No.: US 7,744,831 B2
(45) Date of Patent: Jun. 29, 2010

(54) ANNULAR DISTRIBUTOR HAVING GUIDE VANE TO IMPROVE FLOW RATE DISTRIBUTION

(75) Inventors: Sang Baek Shin, Daejeon (KR); Sang Phil Han, Daejeon (KR); Ye Hoon Im, Daejeon (KR); Young Bae Kim, Yeosu-si (KR); Jung Hoon Chang, Yeosu-si (KR)

(73) Assignee: LG Chem, Ltd., Seoul (KR)

( * ) Notice: Subject to any disclaimer, the term of this patent is extended or adjusted under 35 U.S.C. 154(b) by 581 days.

(21) Appl. No.: 11/710,573

(22) Filed: Feb. 26, 2007

(65) Prior Publication Data
US 2007/0202022 A1    Aug. 30, 2007

(30) Foreign Application Priority Data

| Feb. 24, 2006 | (KR) | .................. 10-2006-0018268 |
| Apr. 6, 2006 | (KR) | .................. 10-2006-0031381 |
| Apr. 20, 2006 | (KR) | .................. 10-2006-0035936 |

(51) Int. Cl.
*B01J 8/02* (2006.01)
*B01J 8/04* (2006.01)
*B01J 10/00* (2006.01)
*F28D 7/00* (2006.01)
*F28D 21/00* (2006.01)
*C07C 51/16* (2006.01)

(52) U.S. Cl. ................. 422/220; 422/129; 422/188; 422/197; 422/201; 422/202; 562/545

(58) Field of Classification Search ............ 422/220, 422/201, 202, 197, 188; 562/545
See application file for complete search history.

(56) References Cited

U.S. PATENT DOCUMENTS

| 3,871,445 A | * | 3/1975 | Wanka et al. ........ 165/104.14 |
| 4,360,059 A | | 11/1982 | Funke |
| 6,756,023 B1 | * | 6/2004 | Corr et al. ................ 422/198 |
| 2005/0143601 A1 | * | 6/2005 | Ha et al. .................... 562/532 |

FOREIGN PATENT DOCUMENTS

| EP | 1 080 781 B1 | 3/2006 |
| EP | 1 080 780 B1 | 8/2007 |
| JP | 07-031866 | 2/1995 |

(Continued)

*Primary Examiner*—Walter D Griffin
*Assistant Examiner*—Natasha Young
(74) *Attorney, Agent, or Firm*—McKenna Long & Aldridge LLP

(57) ABSTRACT

Disclosed is an annular distributor having: an annular slit layer that is mounted on an inner circumferential surface of the annular distributor and has at least one slit discharging or introducing a fluid; at least one opening that is formed on an outer circumferential surface of the annular distributor and is connected with any one of a fluid supply duct and a fluid discharge duct; and at least one guide vane selected from three types of guide vanes that are installed in the annular distributor, and splits a flow rate of the fluid supplied from the duct or collects a flow rate of the fluid discharged to the duct. And disclosed are a reactor or heat exchanger has the annular distributor, and a method of producing unsaturated aldehyde or unsaturated acid from olefin by catalytic gas phase oxidation in the reactor.

20 Claims, 10 Drawing Sheets

FOREIGN PATENT DOCUMENTS

| | | |
|---|---|---|
| JP | 2005-140390 | 6/2005 |
| KR | 10-1992-0014882 | 12/1996 |
| KR | 10 0123458 | 9/1997 |
| KR | 10-2001-0050267 | 6/2001 |
| KR | 10-2002-0016024 A | 3/2002 |
| WO | WO 01/32301 A1 | 5/2001 |

* cited by examiner

ANNULAR DISTRIBUTOR HAVING GUIDE VANE TO IMPROVE FLOW RATE DISTRIBUTION

This application claims the benefit of the filing date of Korean Patent Application Nos. 10-2006-0018268, 10-2006-0031381 and 10-2006-0035936, filed on Feb. 24, 2006, Apr. 6, 2006 and Apr. 20, 2006, respectively in the Korean Intellectual Property Office, the disclosure of which are incorporated herein in their entirety by reference.

BACKGROUND OF THE INVENTION

1. Field of the Invention

The present invention relates to an annular distributor having a guide vane to improve flow rate distribution therein, and a reactor or a heat exchanger having the annular distributor.

2. Description of the Related Art

In general, a multitubular catalytic reactor in the form of a heat exchanger is used for the purpose of efficiently removing heat produced in reaction. Such a reactor has solid catalyst filled in a plurality of reaction tubes, and supplies reaction gas into the reaction tubes to create chemical reaction in order to obtain a desired component. In addition, heat medium circulates through a reactor shell so that the chemical reaction can take place in an optimum condition.

The multitubular catalytic reactor tends to have hot spots at specific areas of the reaction tubes. Such a hot spot causes problems such as shortened lifetime and degraded selectivity for a target product owing to the deterioration of the catalyst. Thus, various approaches have been promoted to achieve efficient heat transfer to the reaction tubes inside the reactor in order to decrease the hot spots.

For example, Korean Laid-Open Patent Application No. 2001-0050267 discloses a multitubular reactor including a circulation unit for a heat medium and doughnut and disk-shaped baffle plates equipped in a shell. This approach attempts to maintain the flow rate of the heat medium in a specific area inside the reactor in order to improve heat transfer performance. In addition, openings, such as slits, are arranged intermittently along the periphery of a slit layer of an annular distributor so that an offset flow of the heat medium supplied (or discharged) through one duct can be supplied (or discharged) into the reactor uniformly in a circumferential direction. Such an annular distributor is designed to achieve a controlled flow of the heat medium to be uniformly supplied (or discharged) in a radial direction in order to lower hot spot temperature of the reaction tubes. Furthermore, a lot of openings are provided in rows and the number and sizes are adjusted in order to make the flow of the heat medium uniform.

However, by merely adjusting the number and size of the slit openings of the annular distributor in the reactor or heat exchanger, it is not possible to efficiently distribute the heat medium supplied into the annular distributor in order to enhance local heat transfer efficiency up to a desirable value.

SUMMARY OF THE INVENTION

The inventors found that the flow of fluid such as heat medium introduced from a duct of a reactor or heat exchanger into a conventional annular distributor creates disturbance caused by collision against an annular layer wall arranged in the inner circumferential surface of the annular distributor and having fluid passage slits. Such disturbance causes non-uniformity to the flow of heat medium, which acts as an obstacle against uniform distribution of heat medium in the annular distributor about the position of the duct, and as a result, flow rate entering the reactor or heat exchanger through a slit opening located on the annular layer becomes ununiform, thereby lowering heat transfer efficiency.

In order to overcome problems as above, an object of the invention is to provide an annular distributor which has a guide vane capable of improving flow rate distribution of fluid entering or exiting a duct, and thus can improve uniformity of fluid flow without adjustment in the dimension of slits located on an annular slit layer.

Another object of the invention is to provide an annular distributor which has a guide vane acting as a measure to distribute fluid such as heat medium, and thus can control the amount of fluid entering/exiting according to axial position of a reactor or heat exchanger and concentrate fluid flow to a hot spot where a reaction is violent in order to increase heat transfer efficiency thereby suppressing localized temperature rise.

A further object of the invention is to provide a reactor or heat exchanger having the same annular distributor.

Yet another object of the invention is to provide a method of producing unsaturated aldehyde or unsaturated acid from olefin through catalytic gas phase oxidation in the reactor having the annular distributor.

The present invention provides an annular distributor, which includes:

an annular slit layer that is mounted on an inner circumferential surface of the annular distributor and has at least one slit discharging or introducing a fluid;

at least one opening that is formed on an outer circumferential surface of the annular distributor and is connected with any one of a fluid supply duct and a fluid discharge duct; and at least one guide vane selected from three types of guide vanes that are installed in the annular distributor, and splits a flow rate of the fluid supplied from the duct or collects a flow rate of the fluid discharged to the duct, wherein, among the three types of guide vanes, the first type guide vane is two or more in number, is installed in a longitudinal direction, and includes (i) a first vertical deflection plate that is spaced apart from the slit layer and is located between the slit layer and the opening and (ii) a second vertical deflection plate that is not coaxial with the first vertical deflection plate and is connected with both an inner end of the first vertical deflection plate and the slit layer;

the second type guide vane is installed in a longitudinal direction along an extension line of the diameter of a circle formed by the inner circumferential surface of the annular distributor, and is connected from one point between the slit layer and the opening to the slit layer; and the third type guide vane is installed in a transverse direction along the inside of the annular distributor, and is connected with the slit layer and the outer circumferential surface of the annular distributor.

The invention also provides a reactor or heat exchanger having the annular distributor. Furthermore, the invention provides a method of producing unsaturated aldehyde or unsaturated acid from olefin by catalytic gas phase oxidation in the reactor.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE INVENTION

Reference will now be made in greater detail to an exemplary embodiment of the invention.

Reactor or Heat Exchanger Having Annular Distributor

An annular distributor of the present invention can be applied to supply or discharge a fluid such as a heat medium to or from a cylindrical catalytic reactor or heat exchanger. In particular, the annular distributor of the present invention is suitable for a shell-and-tube type of multitubular reactor or heat exchanger, which can be used for catalytic gas phase oxidation.

Therefore, according to the present invention, the reactor or heat exchanger includes the annular distributor with at least one slit layer and at least one guide vane. As an exemplary example of the catalytic gas phase oxidation for which the reactor or heat exchanger can be used, there is a process of producing unsaturated aldehyde or acid from olefin. This process includes unlimited examples such as a process of oxidizing propylene or propane to produce acrolein and/or acrylic acid, a process of oxidizing isobutylene, t-butyl alcohol, or methyl-t-butylether to produce meta-acrolein and/or meta-acrylic acid, a process of oxidizing naphthalene or orthoxylene to produce phthalic anhydride, a process of partly oxidizing benzene, butylene or butadiene to produce maleic anhydride, and so forth.

As long as the annular distributor of the present invention is applied to such a cylindrical reactor, it is not restricted on the usage due to a kind of final product such as (meta)acrolein or (meta)acrylic acid produced by the cylindrical reactor.

Hereinafter, the present invention will be described regarding features of the annular distributor used for the multitubular catalytic reactor, but it is not limited to the multitubular catalytic reactor.

Herein, the heat medium corresponds to an example of the fluid, and thus includes unlimited examples, one of which is a medium having very high viscosity, for instance, molten salt. The molten salt is primarily composed of a mixture of potassium nitrate and sodium nitrite. Other examples of the heat medium include phenylether (e.g., Dowtherm), polyphenyl (e.g., Therm S), hot oil, naphthalene derivative (S.K. oil), mercury, and so on.

Figure 1:
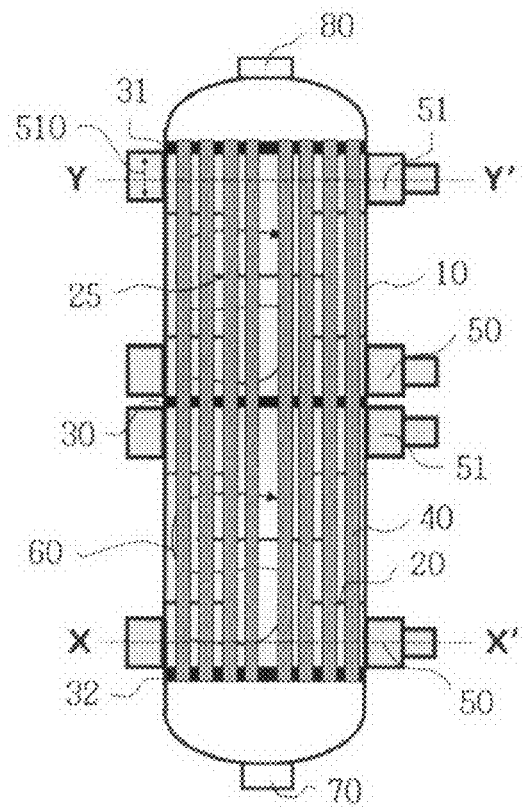
FIG. 1 is a cross-sectional view illustrating the configuration of a multitubular catalytic reactor or a heat exchanger, an outer circumferential surface of which is provided with an annular distributor having a first type guide vane or a second type guide vane in accordance with the present invention.

FIG. 1 is a cross-sectional view illustrating the configuration of a multitubular catalytic reactor, an outer circumferential surface of which is provided with an annular distributor having a first type guide vane or a second type guide vane in accordance with the present invention. Further, FIG. 2 is a cross-sectional view illustrating the configuration of a multitubular catalytic reactor, an outer circumferential surface of which is provided with an annular distributor having a third type guide vane 113 in accordance with the present invention.

Figure 2:
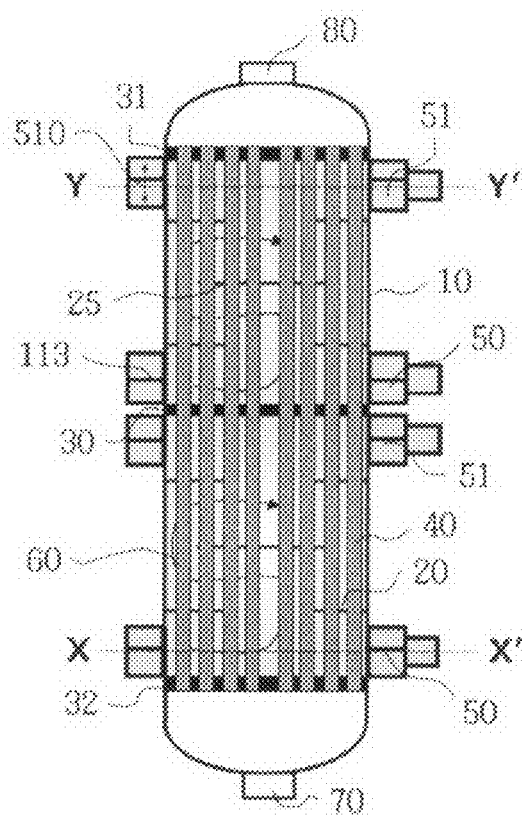
FIG. 2 is a cross-sectional view illustrating the configuration of a multitubular catalytic reactor or a heat exchanger, an outer circumferential surface of which is provided with an annular distributor having a third type guide vane in accordance with the present invention.

As illustrated in FIGS. 1 and 2, as long as the annular distributor of the present invention has a cylindrical structure, the usage of the annular distributor is not restricted on the kind of the reaction gas or heat medium of the reactor. Therefore, the annular distributor of the present invention can be applied to a typical heat exchanger that is not directed to chemical reaction.

In FIGS. 1 and 2, the reactor includes a plurality of reaction tubes 40, which are fixed to a plurality of tube seats 30, 31 and 32 in a cylindrical shell 10. The tube seat 30 is located at the center of the reactor, separates the shell into two shells, and allows a reaction temperature to be adjusted by an independent heat medium. The two shells are provided with an annular distributor 50 connected to a heat medium supply duct and an annular distributor 51 connected to a heat medium discharge duct, respectively. Although the reactor illustrated in FIGS. 1 and 2 includes four annular distributors, the present invention is not limited to the number of annular distributors caused by the separation of the shell. The heat medium 60 supplied through this annular distributor flows along a channel formed by a doughnut-shaped baffle plate 20 and a disk-shaped baffle plate 25. The reaction gas is supplied through a reaction gas supply duct 70, passes through the plurality of reaction tubes 40, and is again collected and discharged through a reaction gas discharge duct 80.

Annular Distributor

The annular distributor of the present invention includes:

an annular slit layer that is mounted on an inner circumferential surface of the annular distributor and has at least one slit discharging or introducing a fluid;

at least one opening that is formed on an outer circumferential surface of the annular distributor and is connected with any one of a fluid supply duct and a fluid discharge duct; and at least one guide vane selected from three types of guide vanes that are installed in the annular distributor, and splits a flow rate of the fluid supplied from the duct or collects a flow rate of the fluid discharged to the duct, wherein, among the three types of guide vanes, the first type guide vane is two or more in number, is installed in a longitudinal direction, and includes (i) a first vertical deflection plate that is spaced apart from the slit layer and is located between the slit layer and the opening and (ii) a second vertical deflection plate that is not coaxial with the first vertical deflection plate and is connected with both an inner end of the first vertical deflection plate and the slit layer;

the second type guide vane is installed in a longitudinal direction along an extension line of the diameter of a circle formed by the inner circumferential surface of the annular distributor, and is connected from one point between the slit layer and the opening to the slit layer; and the third type guide vane is installed in a transverse direction along the inside of the annular distributor, and is connected with the slit layer and the outer circumferential surface of the annular distributor.

In the annular distributor of the present invention, the slit layer refers to an annular layer having at least one slit opening introducing or discharging the fluid. Here, the annular layer includes a discontinuous annular layer, i.e., an arcuate layer. Generally, the slit layer having at least one slit is disposed on the inner circumferential surface of the annular distributor.

In the annular distributor of the present invention, the annular slit layer includes a single slit layer in which the slit layer having at least one slit is one in number as well as multiple slit layers in which the slit layer having at least one slit is two or more in number.

Further, heights and widths of the slits within the slit layer(s) are not particularly restricted. Therefore, the heights or the widths may be the same, or be different if necessary. A shape of each slit is not particularly restricted. Therefore, the shape of each slit includes unlimited examples such as a quadrilateral shape, a circular shape, an oval shape, and so on. Further, the number and arrangement of the slits within the slit layer(s) is not particularly restricted. Therefore, the slits can be disposed regularly or irregularly, that is, at arbitrary positions.

Also, in the annular distributor of the present invention, the fluid supply duct or the fluid discharge duct can be connected to the opening.

In addition, the first vertical deflection plate constituting the first type guide vane, the second type guide vane, and/or the third type guide vane can extend beyond the opening, and thus up to the inside of the duct connected to the opening. This is for more effectively splitting or collecting the flow rate of the fluid introduced from or discharged to the duct, and for inhibiting the disturbance of fluid flow to equally distribute the fluid flow in a circumferential direction.

The annular distributor of the present invention can be provided with a shutoff plate. Specifically, in order to prevent the disturbance that can be generated by meeting of the heat media flowing in the annular distributor in opposite directions, the shutoff plate blocking the fluid flow can be installed in the annular distributor in a longitudinal direction with the same size as a longitudinal cross section of the annular distributor. At this time, when the opening formed in the annular distributor is one in number, the shutoff plate can be installed on the opposite side to a central axis of the opening, i.e. at a position rotated 180° from the opening, in a longitudinal direction. Further, when the opening formed in the annular distributor is two or more in number, the shutoff plate can be longitudinally installed at each position corresponding to the half of an angle defined by a center of a circle formed by the slit layer and central axes of two adjacent ones of the openings.

In the annular distributor of the present invention, the guide vanes and the shutoff plate are not particularly limited to a thickness, but they are preferably formed as thin as possible.

The annular distributor of the present invention is not particularly limited to a material thereof. The material of the annular distributor includes unlimited examples such as steel, SUS material, and so on.

Meanwhile, the annular distributor of the present invention can be fabricated by welding at least one guide vane having a predetermined size to the inside thereof, and welding at least one slit layer machining a steel sheet and bending it in a cylindrical shape to the inner circumferential surface thereof. If the slit layer is one in number, the steel sheet is not separately required, and thus the shell of the reactor or heat exchanger can serve as the inner circumferential surface of the annular distributor.

Hereinafter, the features of the annular distributor having at least one selected from the three types of guide vanes will be described with reference to the accompanying drawings. However, the annular distributor of the present invention is not limited to one having a single type of guide vane as described below. Therefore, the annular distributor having a combination of these guide vanes falls within the scope of the prevent invention.

Annular Distributor Having First Type Guide Vane

According to an embodiment of the present invention, the annular distributor is constructed such that an annular slit layer having at least one slit discharging or introducing a fluid is mounted on an inner circumferential surface of the annular distributor, that an opening connected with a duct is formed in an outer circumferential surface of the annular distributor, and that a first type guide vane splitting a flow rate of the fluid supplied from the duct or collecting a flow rate of the fluid discharged to the duct is installed in a longitudinal direction. In order to describe this annular distributor, a cross-sectional view of the annular distributor taken along the line X-X' or the line Y-Y' of FIG. 1 is illustrated in FIG. 3.

In the annular distributor of the present invention, the first type guide vane 111 is two or more in number, is installed in a longitudinal direction, and includes (i) a first vertical deflection plate that is spaced apart from the slit layer and is located between the slit layer and the opening and (ii) a second vertical deflection plate that is not coaxial with the first vertical deflection plate and is connected with both an inner end of the first vertical deflection plate and the slit layer. At this time, in the case in which an angle formed by three factors, which consists of the center of a circle formed by the slit layer, an central axis of the opening, and one point on the slit layer, is a predetermined value, the slit layer connected with the second vertical deflection plate is preferably located at one point thereon.

Figure 3:
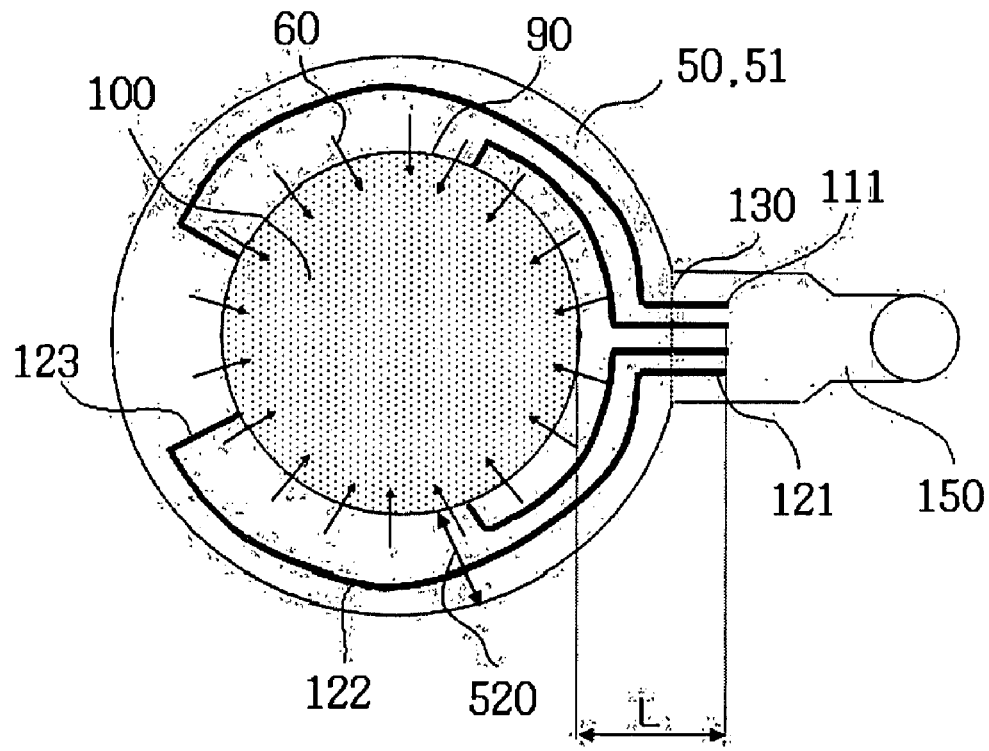
FIG. 3 is a cross-sectional view of the annular distributor taken along the line X-X' or the line Y-Y' of FIG. 1, in which an annular slit layer and a first type guide vane are installed to the annular distributor in accordance with an embodiment of the present invention.

In FIG. 3, the first vertical deflection plate 121 constituting the first type guide vane 111 extends beyond the opening 130, i.e., up to the inside of the duct 150 connected to the opening. Thereby, the flow rate of the fluid introduced from or discharged to the duct is more effectively split or collected, and the disturbance of fluid flow is inhibited, so that the fluid flow can be equally distributed in a circumferential direction.

Further, a length L from the slit layer 90 to an outer end of the first vertical deflection plate 121 in an outer circumferential direction is formed as long as possible, preferably, at least as one time of a width 520 of the annular distributor such that the fluid flow is stable and has a fully developed flow although the length L is dependent on how the duct is connected.

In the annular distributor of the present invention, in order to more effectively split or collect the flow rate of the fluid introduced from or discharged to the duct, and equally distribute the fluid flow in a circumferential direction, the first vertical deflection plate of the first type guide vane is preferably parallel to the central axis of the opening 130.

The second vertical deflection plate of the first type guide vane may include (a) a first base part 122 that is connected with the end of the first vertical deflection plate toward the slit layer and is spaced apart from the slit layer in an arcuate shape, and (b) a second base part 123 that is connected with one end of the first base part, which is not connected with the first vertical deflection plate, and one point on the slit layer. At this time, the second base part 123 is not required to have the shape of a straight line toward the center of the circle formed by the slit layer as in FIG. 3, and thus may have a curved shape.

In FIG. 3, the annular distributors 50 and 51 can have four regions by means of four first type guide vanes 111, which are longitudinally installed in the annular distributors. The flow rate and direction of the fluid at each region in the annular distributors can be independently or organically adjusted. At this time, the flow rate of the fluid at each region in the annular distributors is preferably uniform, which is achieved by properly adjusting the position and length of each of the first type guide vanes 111.

In FIG. 3, the heat medium supplied from the heat medium supply duct 150 connected to the opening 130 is distributed at a constant rate, preferably, uniformly by means of the first type guide vanes 111 that are longitudinally installed in the annular distributor 50, and flows to each region. Then, the heat medium passes through the slit in the slit layer 90, and is introduced into the inside 100 of the reactor. When the heat medium passes through the slit layer 90, it is in direct contact with the reaction tube at the inside 100 of the reactor. The heat medium contacting the reaction tube along a channel formed by the baffle plates passes through the slit in the slit layer, and is introduced into another annular distributor 51. The heat medium is again collected at a uniform flow rate in the state where no disturbance is generated by the first type guide vanes 111, and then is discharged through the discharge duct 150.

In the annular distributor having the first type guide vanes according to the present invention, when the first type guide vanes are divided into two parts on the basis of the central axis of each opening, the guide vane(s) installed on one side can be symmetrical with the guide vane(s) installed on the other side. This symmetry makes it easy to install the guide vanes such that the flow rate of the fluid is uniform at each of the regions divided by the guide vanes.

Figure 4:
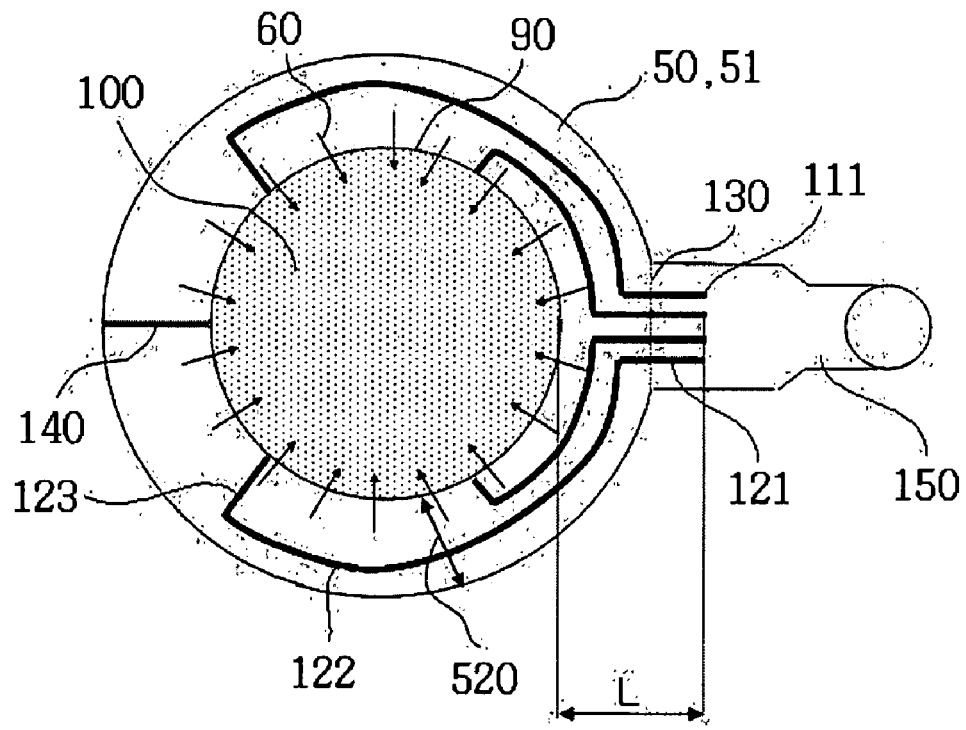
FIG. 4 is a cross-sectional view of the annular distributor taken along the line X-X' or the line Y-Y' of FIG. 1, in which an annular slit layer, a first type guide vane, and a shutoff plate are installed to the annular distributor in accordance with another embodiment of the present invention.
Figure 5:
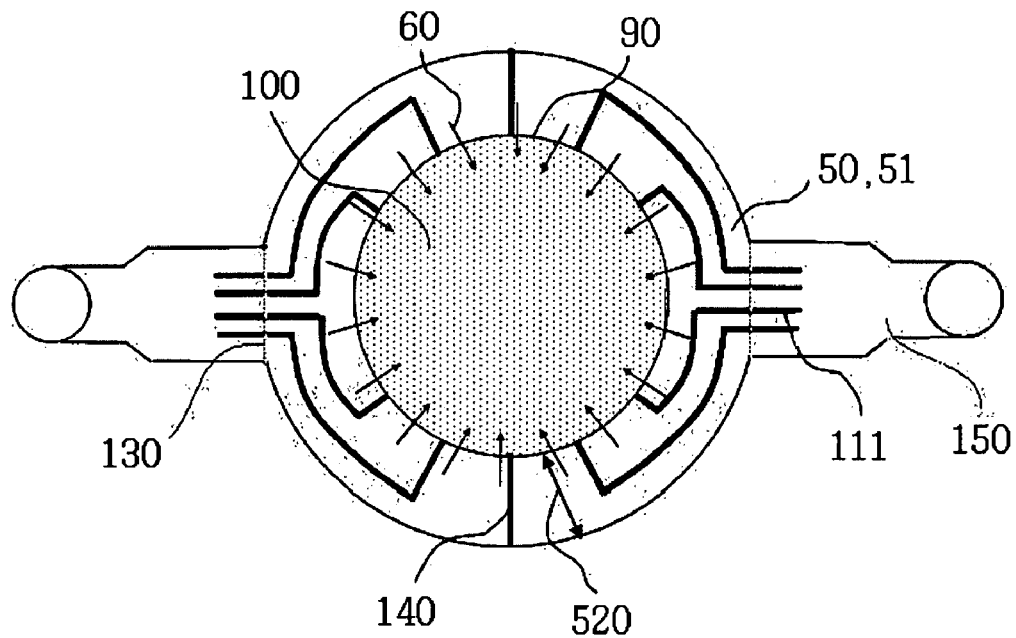
FIG. 5 is a cross-sectional view of the annular distributor taken along the line X-X' or the line Y-Y' of FIG. 1, in which an annular slit layer, a first type guide vane, and two shutoff plates are installed to the annular distributor in accordance with another embodiment of the present invention.

As in FIGS. 4 and 5, the annular distributor of the present invention can be provided with the shutoff plate 140 as described above. In FIG. 4, one opening 130 is provided to the annular distributor, and one shutoff plate 140 is longitudinally installed on the opposite side to the opening. Further, in FIG. 5, two openings 130 are provided to the annular distributor, and two shutoff plates 140 are longitudinally installed between the two openings.

Further, in the case in which the shutoff plate is installed in the annular distributor, each of the first type guide vanes is installed in a region from the central axis of the opening to the shutoff plate. Thereby, each of the first type guide vanes is preferably prevented from passing through the shutoff plate.

In the present invention, the first type guide vane can be multiple guide vanes in which 2n guide vanes are independently installed to each opening (here, n is an integer of 1 or more). In other words, the first type guide vane can be an even number of first type guide vanes in correspondence with each opening. However, the first type guide vanes are not necessary to be installed in the same number at each opening, and are preferably installed so as not to encounter with each other.

Further, the first type guide vane is the multiple guide vanes in which 2n guide vanes are independently installed to each opening (here, n is an integer of 1 or more), and thus among the multiple guide vanes installed to each opening, the guide vane located on the outermost side on the basis of the center of the circle formed by the first base part of each guide vane is called a first guide vane, and then the other guide vanes are called a second guide vane, a third guide vane, . . . , an $m^{th}$ guide vane, which are sequentially located toward the center of the circle (here, m is an integer of 2 or more).

In this case, a difference ($R_{out}-R_1$) between a radius ($R_{out}$) of the outer circumferential surface of the annular distributor and a radius ($R_1$) of the circle formed by the first base part of the first guide vane, a difference ($R_1-R_2$) between a radius ($R_1$) of the circle formed by the first base part of the first guide vane and a radius ($R_2$) of the circle formed by the first base part of the second guide vane, . . . , a difference ($R_{m-1}-R_m$) between a radius ($R_{m-1}$) of the circle formed by the first base part of the $(m-1)^{th}$ guide vane and a radius ($R_m$) of the circle formed by the first base part of the $m^{th}$ guide vane each may be within a range between 200 mm and 700 mm, or within a range between 5% and 20% of a radius ($R_{in}$) of the inner circumferential surface of the annular distributor.

Figure 6:
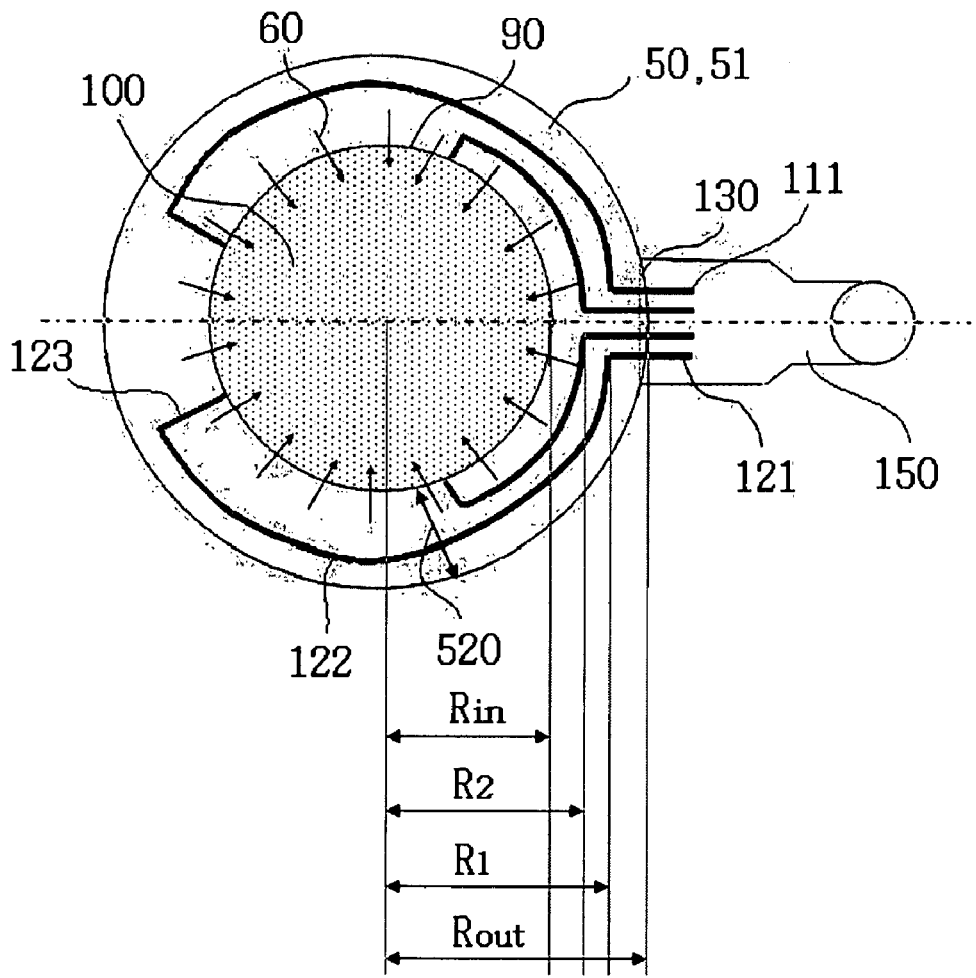
FIG. 6 is a cross-sectional view of the annular distributor taken along the line X-X' or the line Y-Y' of FIG. 1, in which an annular slit layer and a first type guide vane are installed to the annular distributor in accordance with another embodiment of the present invention.

In FIG. 6, as an example, four first type guide vanes are installed in correspondence with one opening, and are symmetrical about the central axis of the opening. At this time, when the guide vane located on the outer side on the basis of the center of the circle formed by the first base part of each guide vane is called a first guide vane, and the other guide vane located on the inner side on the basis of the center of the circle is called a second guide vane, a difference ($R_{out}$–$R_1$) between a radius ($R_{out}$) of the outer circumferential surface of the annular distributor and a radius ($R_1$) of the circle formed by the first base part of the first guide vane, and a difference ($R_1$–$R_2$) between a radius ($R_1$) of the circle formed by the first base part of the first guide vane and a radius ($R_2$) of the circle formed by the first base part of the second guide vane each may be within a range between 200 mm and 700 mm, or within a range between 5% and 20% of a radius ($R_{in}$) of the inner circumferential surface of the annular distributor.

Further, in order to effectively split and collect the fluid introduced or discharged through the duct, and prevent the disturbance in this process, the first type guide vane preferably has a height equal to that 510 of the annular distributor.

Annular Distributor Having Second Type Guide Vane

Figure 7:
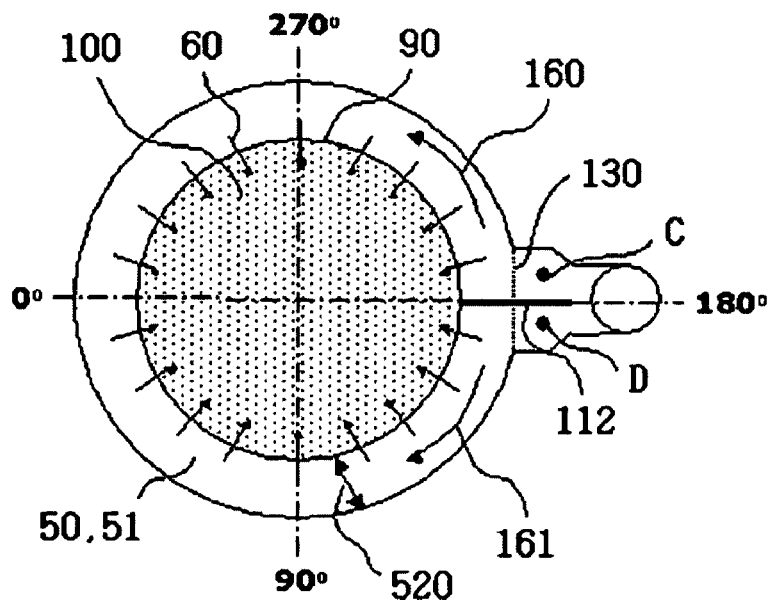
FIG. 7 is a cross-sectional view of an annular distributor having a slit layer and a second type guide vane according to an embodiment of the invention, taken along the line X-X' or the line Y-Y' of FIG. 1.
Figure 8:
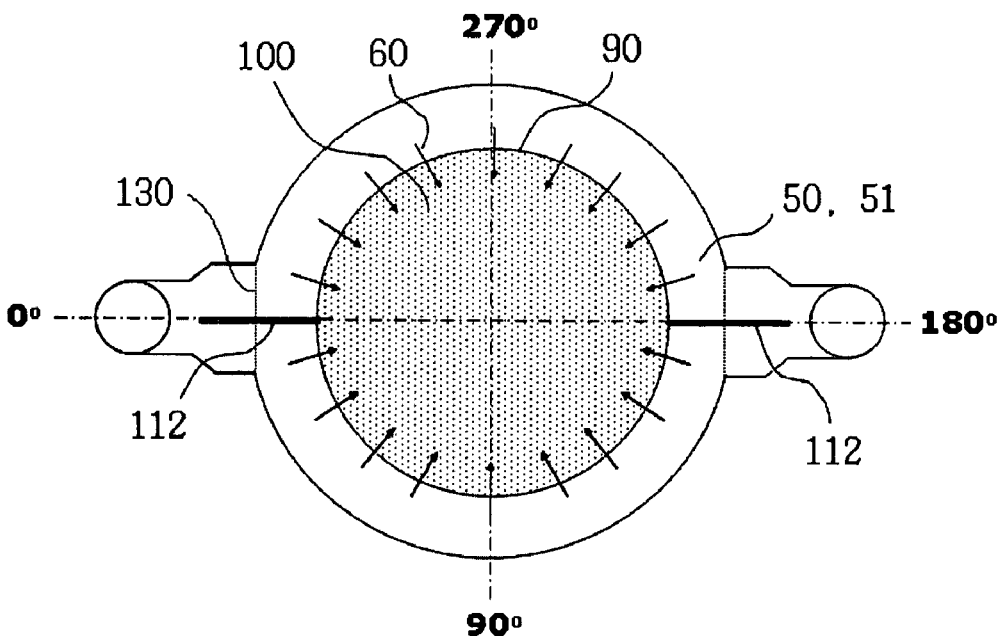
FIG. 8 is a cross-sectional view of an annular distributor having a slit layer and two second type guides vane according to a further embodiment of the invention, taken along the line X-X' or the line Y-Y' of FIG. 1.

According to an embodiment of the present invention, the annular distributor is constructed such that a second type guide vane is longitudinally installed in the annular distributor along the direction of a line extending from the diameter of a circle formed by an inner circumferential surface of the annular distributor, and is connected from one point between a slit layer and an opening to the slit layer. In order to describe this annular distributor, a cross-sectional view of the annular distributor taken along the line X-X' or the line Y-Y' of FIG. 1 is illustrated in FIGS. 7 and 8.

In order to more effectively split and collect the fluid introduced from or discharged to the duct 150, and prevent the disturbance of fluid flow, the second type guide vane 112 can be installed so as to be connected from one point between the slit layer 90 and the opening 130 to the slit layer 90.

The second type guide vane 112 is preferably installed along the direction of a line extending from the diameter of the circle formed by the inner circumferential surface of the annular distributor and simultaneously of diametric axes of cross sections of inlet and outlet of the ducts connected to the openings 130. For example, the second type guide vane 112 can be longitudinally installed along a direction of 180° in FIG. 7.

If the second type guide vane is not installed along the direction of the line extending from the diameter of the circle formed by the inner circumferential surface of the annular distributor and simultaneously of the diametric axes of the cross sections of the inlet and outlet of the ducts connected to the openings, a flow of the fluid introduced from or discharged to the duct is not smooth to thus generate the disturbance, which is not preferable. Further, if the second type guide vane is installed along the direction of the line extending from the diameter of the circle formed by the inner periphery of the annular distributor and simultaneously of the diametric axes of the cross sections of the inlet and outlet of the ducts connected to the openings, a flow rate of the fluid introduced from the duct on the basis of the second type guide vane can be split at the same rate, or a flow rate of the fluid discharged to the duct on the basis of the second type guide vane can be collected at the same rate.

In the case in which the annular distributor of the present invention has at least two openings 130, and each opening is connected with the duct 150, the second type guide vane 112 can be zero or one in number at each region where the duct is located. However, in order to guarantee smooth inflow or outflow of the fluid without the disturbance, the second type guide vane is preferably one or more in number.

In FIG. 7, the heat medium supplied from the heat medium supply duct 150 connected to the opening 130 can be introduced into the annular distributor 50 by means of a path as described above with reference to FIG. 3, and can be discharged from the annular distributor 51.

In FIG. 8, the annular distributor has two openings 130 and two second type guide vanes 112, wherein each of the two openings is connected with the duct. The second type guide vanes 112 are installed along the direction of a line extending from the diameter of the circle formed by the inner circumferential surface of the annular distributor and simultaneously of diametric axes, i.e. 0° and 180°, of cross sections of inlet and outlet of the ducts connected to the openings 130.

Each of the second type guide vanes is not particularly limited to a shape thereof. The shape of second type guide vane includes unlimited examples such as a triangular prism, a quadrangular prism, an oval column, a semi-oval column, a semi-circular column, a criss-cross prism, a plate shape, and so on. Further, in order to effectively split and collect the fluid introduced or discharged through the duct, and prevent the disturbance in this process, the second type guide vane preferably has a height equal to that 510 of the annular distributor.

In the second type guide vane, a length from an inner circumferential surface to an end toward the outer circumferential surface is preferably at least half as wide as a width 520 of the annular distributor. If the length of the second type guide vane from the inner circumferential surface to the end toward the outer circumferential surface is less than one half of the width 520 of the annular distributor, the effect of installing the second type guide vane is bad because the fluid collides with the inner circumferential surface to be under the influence of disturbed flow. In contrast, because the maximum length of the second type guide vane is dependent on how the duct is connected, it cannot be limited. Thus, the second type guide vane is preferably located at a portion where the fluid flow is stable and has a fully developed flow by forming the length as long as possible.

Annular Distributor Having Third Type Guide Vane

Figure 9:
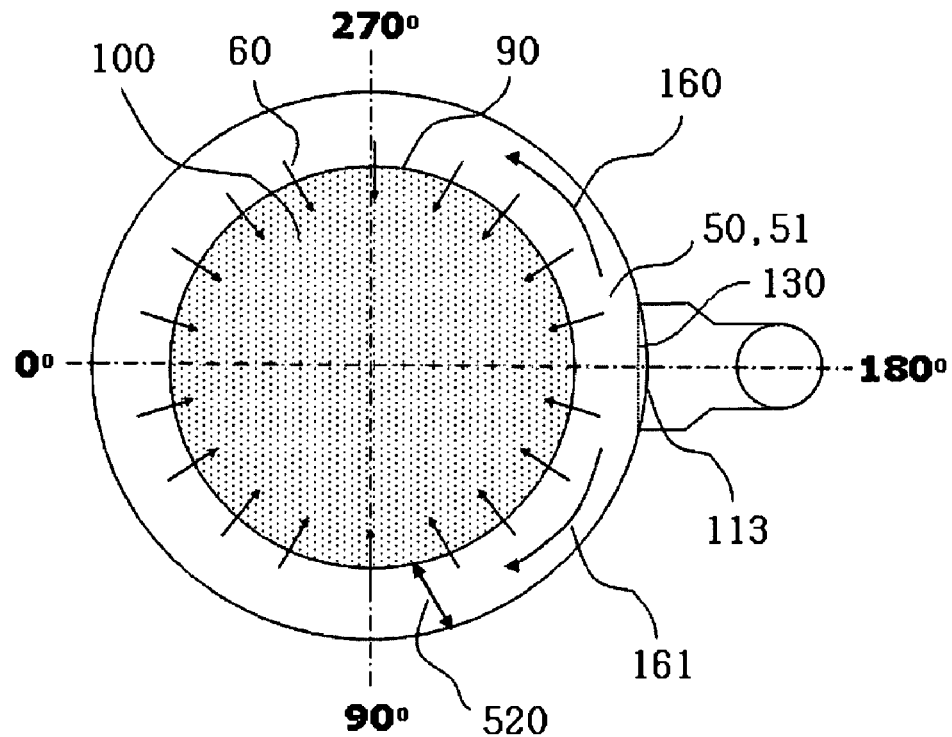
FIG. 9 is a cross-sectional view of an annular distributor having a slit layer and a third type guide vane according to an embodiment of the invention, taken along the line X-X' or the line Y-Y' of FIG. 2.
Figure 10:
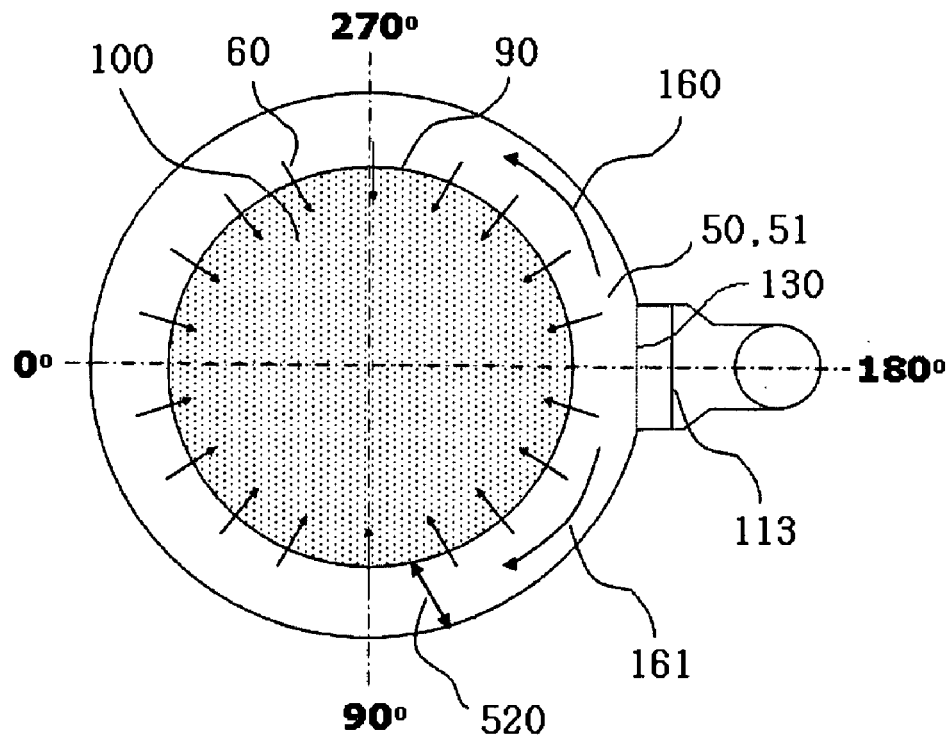
FIG. 10 is a cross-sectional view of an annular distributor having a slit layer and a third type guide vane according to a further embodiment of the invention, taken along the line X-X' or the line Y-Y' of FIG. 2.

In order to illustrate an annular distributor having a third type guide vane according to an embodiment of the invention, in which the guide vane is installed laterally along the interior of the distributor and connected to a slit layer and the outer circumferential surface, FIGS. 9 and 10 illustrate cross-sectional views taken along the line X-X' or the line Y-Y' of FIG. 2.

Referring to FIG. 9, the slit layer 90 is installed in the inner circumferential surface of the annular distributor 50, 51, and the doughnut-shaped third type guide vane 113 is installed along the interior of the annular distributor.

Referring to FIG. 10, the third type guide vane 113 is installed along the interior of the annular distributor and extended to the interior of the duct 150 connected to the opening 130. The length of the extension of the third type guide vane inserted into the duct is not limited specifically.

Figure 11:
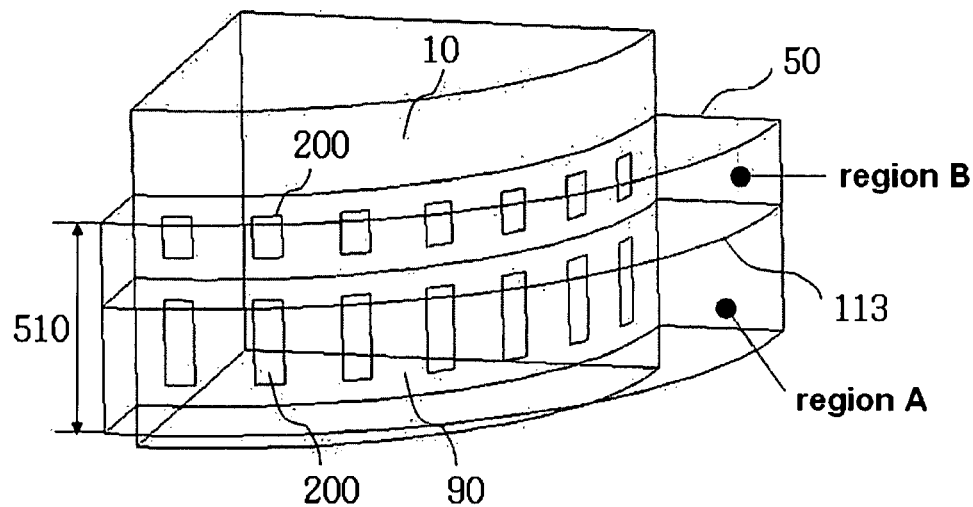
FIG. 11 is a fragmentary perspective view illustrating an annular distributor having a slit layer and a third type guide vane according to an embodiment of the invention.
Figure 12:
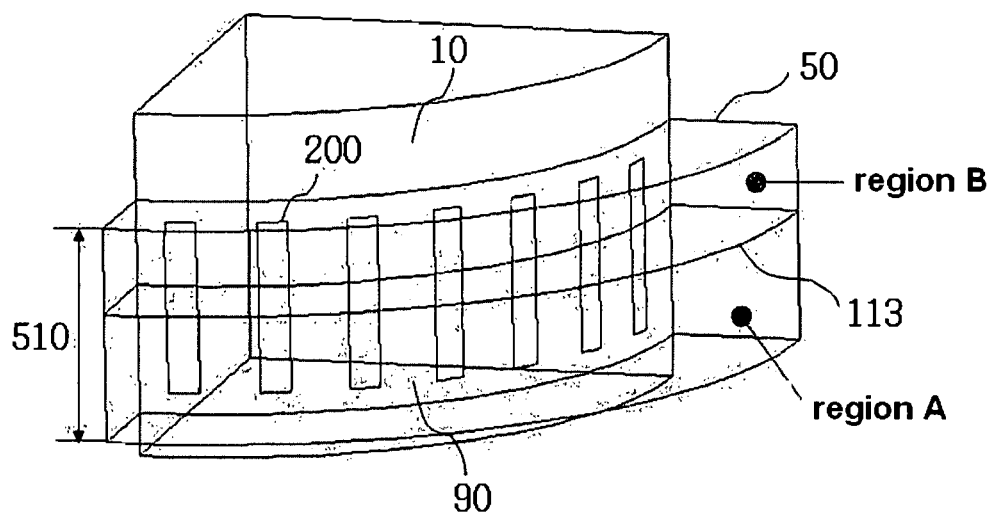
FIG. 12 is a fragmentary perspective view illustrating an annular distributor having a slit layer and a third type guide vane according to another embodiment of the invention.

Referring to FIGS. 11 and 12 each of which illustrate a portion of the annular distributor, fluid such as a heat medium supplied from the heat medium supply duct 150 connected to the opening 130 is divided into two regions of region A and region B by the third type guide vane 113, which is installed laterally along the interior of the annular distributor 50. The heat medium in each of the divided regions passes through the slits 200 existing on the slit layer into the reactor interior 100.

The heat medium, upon passing through the slit layer 90, directly contacts the reaction tubes in the reactor interior 100. The heat medium contacting the reaction tubes along paths defined by the baffle plate flows through the slits 200 in the slit layer 90 and into another annular distributor 51. Then, heat medium is collected by the third type guide vane and discharged by the discharge duct 150.

According to the annular distributor of the invention, the at least two regions of the annular distributor divided by the third type guide vane may have independent adjustments in the dimension and position of the slits on the slit layer. For example, in FIG. 11, in the two regions such as region A and region B of the annular distributor divided by the third type guide vane, the slits 200 existing on the slit layer 90 can be adjusted in dimension and position independently.

In the annular distributor of the invention, the total area of the slit openings in each region divided by the third type guide vane is associated with flow rate distribution and the dimension and position adjustment of the slits is associated with improvement in the flow uniformity of medium in a circumferential direction. Therefore, if each region of the annular distributor divided by the third type guide vane is independently adjusted with the dimension and position of the slits, flow rate entering each region can be adjusted and circumferential flow toward the inside of the reactor can be set to be uniform.

In addition, the at least two regions inside the annular distributor divided by the third type guide vane may share the slits existing on the slit layer. For example, the slits 200 existing on the slit layer 90 as shown in FIG. 12 may not be adjusted separately for region A or region B, but may be shared by region A and region B.

Even though the regions inside the annular distributor divided by the third type guide vane share the slits, the dimension and position of the slits can be adjusted relatively according to the position of the guide vane in order to control flow rate entering each region as well as set flow in a circumferential direction into the reactor to be uniform.

In addition, as shown in FIGS. 11 and 12, region A and region B are divided by a single third type guide vane 113, the ratio of each region and the total dimension of the slits 200 in each region can be adjusted properly in accordance with the way of dividing flow rate to be introduced into each region. That is, flow rate distribution can be varied according to pressure loss, which may occur in each region. The pressure loss may be varied according to the total area of the slit openings in each region. For example, in the case of attempting to introduce 70% of flow rate supplied from the fluid supply duct into region A and 30% of the flow rate into region B, it is preferable that the total area of the slit openings in region A is set to be larger than that in region B. Particularly, the ratio of the total area of the slit openings in region A to the total area of the slit openings in region B is set 70:30. This is preferable to reduce pressure loss.

Figure 13:
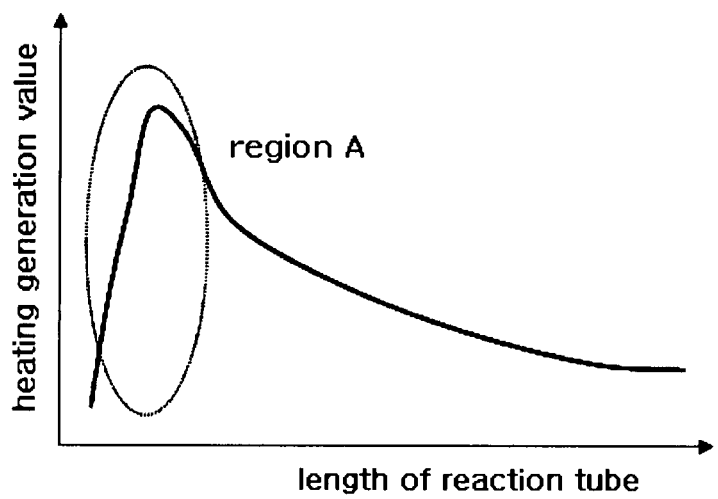
FIG. 13 is a graph illustrating heat generation distribution in reaction tubes of a reactor where catalytic gas phase oxidation takes place.

Referring to FIG. 2 and FIG. 11 (or FIG. 12), in the reactor having the annular distributor of the invention, a position of the reactor corresponding to region A in the annular distributor divided by the third type guide vane may act as a starting point of catalytic gas phase oxidation in view of the entire reactor, where the reaction may be most violent and heat generation is largest. In addition, referring to FIG. 13 illustrating heat generation distribution in reaction tubes of the reactor where catalytic gas phase oxidation takes place, heat generation may be largest in the reaction tube corresponding to region A of the annular distributor.

In this case, the third type guide vane can be adjusted in position so that more heat medium can be introduced into region A divided by the third type guide vane. As more heat medium enters region A, it can raise the heat transfer coefficient in a region of high heat generation thereby suppressing hot spot build-up.

Furthermore, the third type guide vane may be installed by two (2) or more inside the annular distributor to divide the interior of the annular distributor into three (3) or more regions in order to adjust temperature more minutely. Accordingly, in the annular distributor of the invention, the number of the third type guide vane is not limited.

The annular distributor having the third type guide vane according to the present invention is provided on an outer circumferential surface of the reactor or the heat exchanger, and thus can supply or discharge a fluid such as a heat medium.

At this time, in the reactor or the heat exchanger having the annular distributor with the third type guide vane, a doughnut-shaped baffle plate can be additionally installed at the inside of the reactor or the heat exchanger which corresponds to a position inside the annular distributor where the third type guide vane is installed.

Figure 14:
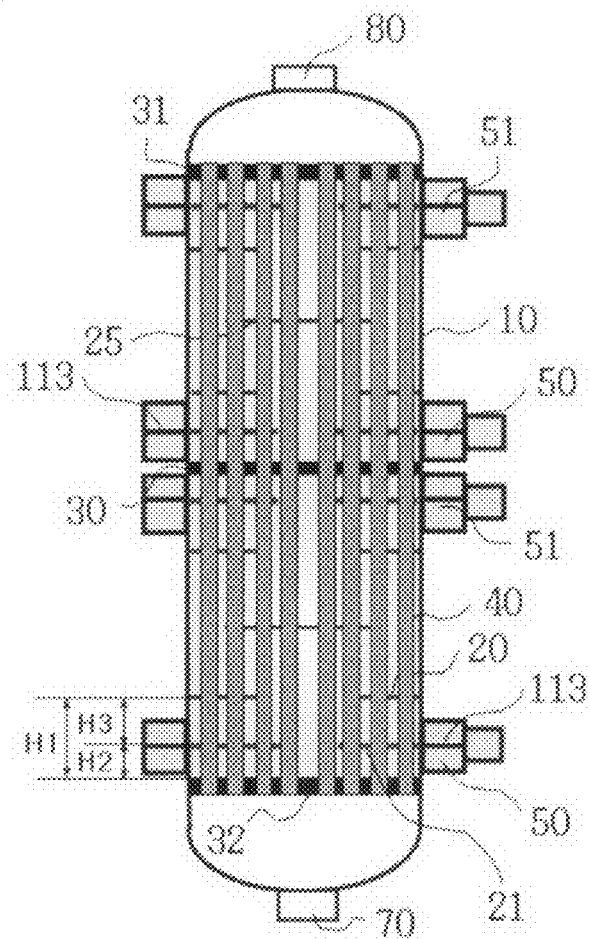
FIG. 14 is a cross-sectional view illustrating a multitubular catalytic reactor or heat exchanger in which an annular distributor having a third type guide vane is provided in the outer circumferential surface and a doughnut-shaped baffle plate is additionally installed in an interior of the reactor or heat exchanger corresponding to a position of the third type guide vane in the annular distributor.

FIG. 14 is a cross-sectional view illustrating a multitubular catalytic reactor or heat exchanger in which annular distributors 50 and 51 having a third type guide vane are provided in the outer circumferential surface, and in which a doughnut-shaped baffle plate is additionally installed at the inside of the reactor or heat exchanger corresponding to a position of the third type guide vane in the annular distributor.

In FIG. 14, when the doughnut-shaped baffle plate 21 is additionally installed at the inside of the reactor or the heat exchanger, the heat medium introduced into the regions in the annular distributor, for instance, the regions A and B of FIG. 11 (or FIG. 12) is allowed to independently flow up to the next pass. A position of the additionally installed doughnut-shaped baffle plate 21 can be installed at a proper position depending on where a portion having high caloric value is located within the pass, and can be installed at a height equal to that at which the third type guide vane is installed in the annular distributor.

Further, in the reactor according to the present invention, the annular distributor can be installed at a position where a hot spot can be generated in the reactor or the heat exchanger. At this time, the annular distributor of the present invention is preferably installed such that among at least two regions partitioned by the third type guide vane in the annular distributor, the region having the total sum of the sizes of the slits where the flow rate of the fluid is adjusted to the maximum extent corresponds to the position where the hot spot is generated in the reactor.

Slit

Figure 15:
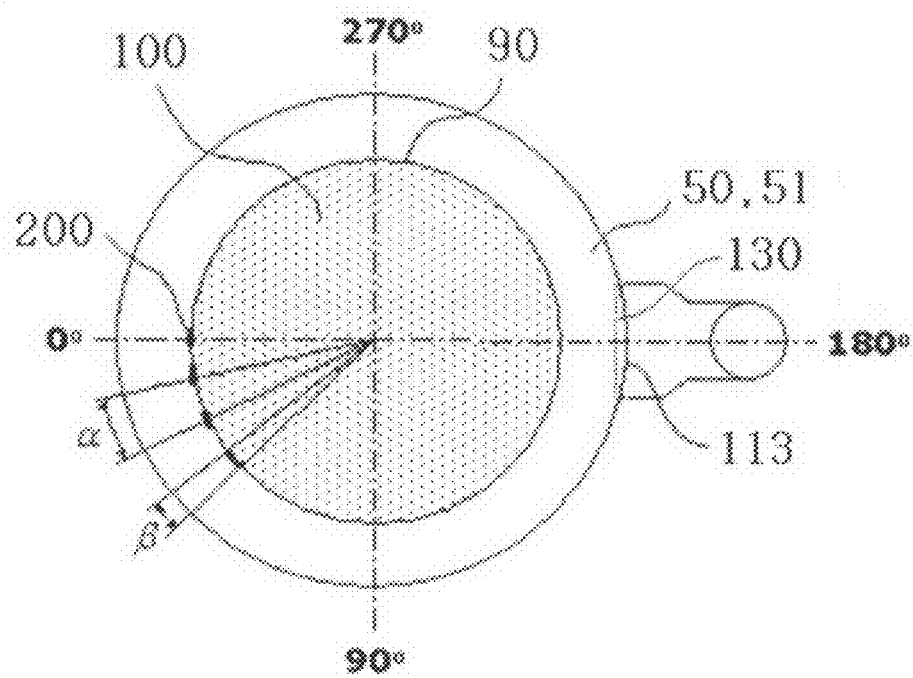
FIG. 15 is a cross-sectional view illustrating an annular distributor according to an embodiment of the invention, in which position and width of slits are indicated.

Referring to FIG. 15, discussion will be made of the position and dimension (preferably width) of slits supplying/discharging fluid such as a heat medium in a slit layer an annular distributor.

In an annular distributor of the invention, slits 200 existing on a slit layer 90 are not particularly limited in the shape. Examples of the slits 200 may include but are not limited to rectangle, circle, eggshape, oval and so on.

The slits existing on the slit layer are arranged preferably with an angle $\alpha$ of 4 to 8° between two adjacent slits and the center of a circle of the slit layer, and with a width angle $\beta$ of 1 to 3°, which is defined by opposing ends of each slit in the width direction about the center of the circle.

When the angle $\alpha$ between the two adjacent slits and the center is smaller than 4°, the number of the slits may be excessively large, which in turn may make it difficult to fabricate the slit layer or cause a structural problem. When the angle α between the two adjacent slits and the center is greater than 8°, the number of the slits may be excessively small, which in turn may make it difficult to uniformly supply heat medium into the reactor in a radial direction by the annular distributor.

The angle α defining the slit position and the angle β defining the slit width are set to one value within the above mentioned range to locate the slits at the same angle, but some of the slits may have different widths to promote uniform flow. That is, the slits positions may be distributed with the preset angle α, but some of the slits in a region where the heat medium exits or enters may have the width angle β outside of the preset angle.

For example, in a case where a fluid supply duct or fluid discharge duct is connected at a point of 180°, and an angle range of 0 to 180° is divided into x number of sub-regions (where x is an integer of 2 or more), in which a first region is set to be most adjacent to 0°, and second to xth regions are set in order to 180°, the xth region has severe variation in flow pattern (the degree of which is determined according to flow rate). Thus, it is preferable to distribute flow rate by adjusting the width of one or two slits to β~2β.

Figure 16:
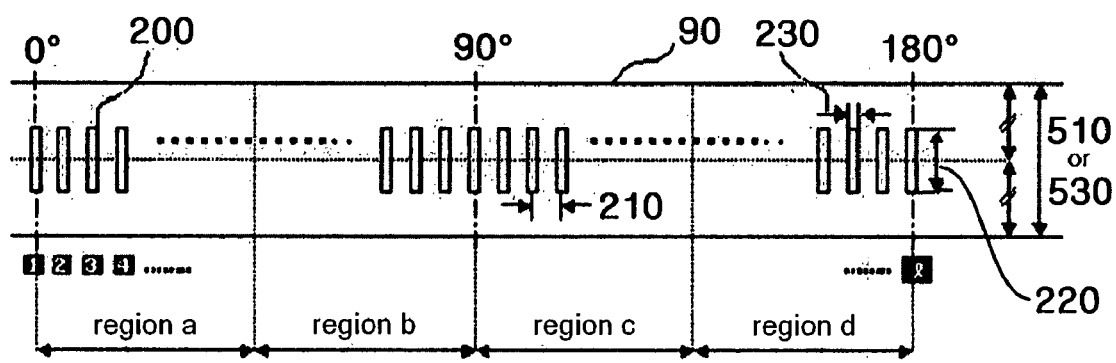
FIG. 16 is a development view of slit layer for illustrating dimension and distribution of slits in an annular distributor according to an embodiment of the invention.

Referring to FIG. 16, more detailed discussion will be made of slit dimensions, particularly, slit height on a slit layer.

Preferably, heights 220 of slits on a slit layer is in the range of 100 to 1,000 mm, or 10 to 70% with respect to a height 510 of an annular distributor, or 10 to 70% with respect to a height 530 of each region in an annular distributor divided by a third type guide vane.

In this case, slits existing on the slit layer can be adjusted to have the same or different heights.

Particularly, in the annular distributor of the invention, the heights of the slits existing on the slit layer can be adjusted according to the following conditions.

(a) In a case where a fluid supply duct or fluid discharge duct is connected at a point of 180°, and an angle range of 0 to 180° is divided into x number of sub-regions variable in slit height independently (where x is an integer of 2 or more), in which a first region is set to be most adjacent to 0°, and second to xth regions are set in order to 180°, the entire slit heights increase from the first region to the x−1th region, but the slits in each region have a uniform height. In the xth region, the slit height is adjusted to decrease to a fluid supply or discharge duct.

(b) The heights of the slits in 180° to 360° region are configured symmetric to those of the slits located in 0° to 180° region.

While the slit heights 220 are illustrated the same for the sake of brevity in FIG. 16, 0° to 180° region of the circumference is preferably divided into two or more regions where slit heights are adjusted.

In a case where the heat medium supply/discharge duct is positioned at 180° direction, the slits in 180° to 360° region are preferably configured to be symmetric to the slits in 0 to 180° region. Such symmetry is applicable variably according to the position or number of heat supply/discharge ducts, and the invention is not limited thereby.

The heights of slit 220 can be variably divided into any regions according to the position of the heat medium supply/discharge ducts. For example, where a heat medium supply/discharge duct is positioned at 180°, if 0° to 180° region is divided into three (3) regions such as 0°~45°, 45°~135° and 135°~180° regions, the slit heights are changed and 180° to 360° region is configured symmetrically to 0° to 180° region. As a result, the slit heights change at every 90° on the entire circumference. If 0° to 180° region is divided into four (4) regions such as 0°~30°, 30°~90°, 90°~150° and 150°~180° regions, the slit heights are changed. In this case, the slit heights are changed at every 60° on the entire periphery. Generalizing it, as 0° to 180° region is divided into x number of regions with different slit heights independent from other regions, the first and xth regions are divided by 0° to 180°/2 (x−1) and 180°~180°/2(x−1) to 180°, respectively, and each region can be divided at every 180°/(x−1).

In the invention, however, in a case where 0° to 180° region is divided into x number of regions with different slit heights independent from other regions, each of the divided regions is not required to maintain a uniform angle but can be changed to any values.

Figure 17:
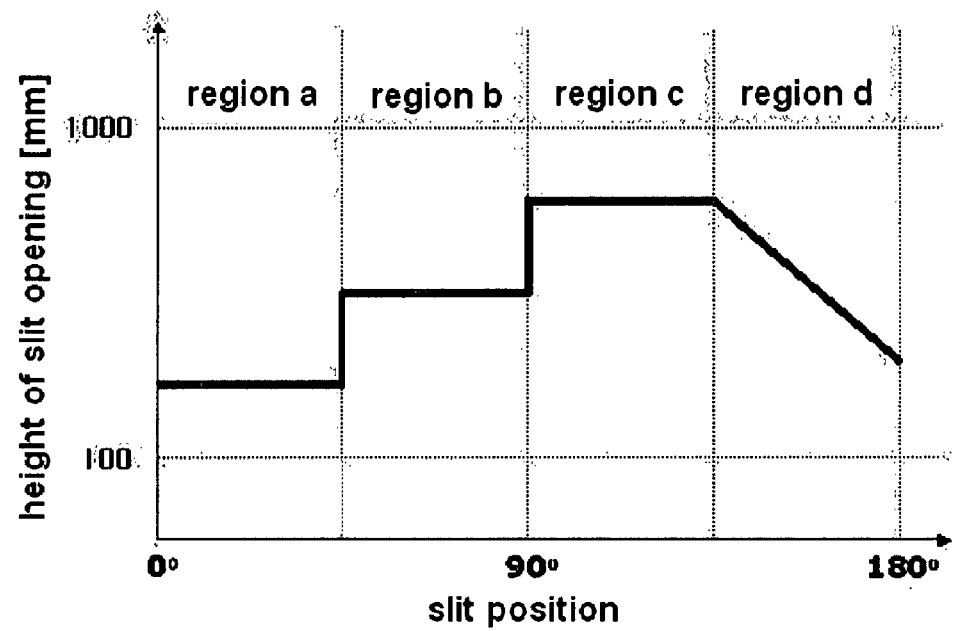
FIG. 17 is a graph illustrating an example of height distribution of slits in an annular distributor according to an embodiment of the invention.

In a case where 0° to 180° region is divided into four (4) regions and the heat medium supply/discharge duct is located at 180° position according to FIG. 16, the slit heights 220 are distributed as shown in FIG. 17. Referring to FIG. 17, the slit heights increase from region a to region c, with the heights in each region maintained constant, but slit heights in region d decrease to the heat medium supply/discharge duct.

The slit heights are adjusted like this according to the following reasons. That is, since region d where the heat medium supply/discharge duct is located has a concentrated flow rate and a large variation in the flow rate according to circumferential position, it is preferred to continuously change the slit dimensions. It is also preferable to set other regions with the slit dimensions having a stepwise decrease away from the heat medium duct so that the flow rate of the heat medium is not concentrated as it moves away from the heat medium duct.

As illustrated in FIG. 15, a width 230 of a slit opening existing on the slit layer are determined by the diameter of a circle of the slit layer since its angle β adjusted to be 1 to 3°. Likewise, the length 210 between centers of adjacent two slits is determined by the diameter of the circle of the slit layer since the angle α is adjusted to be 4 to 8°.

EXAMPLES

Examples of the invention will now be presented. However, it should be construed that following Examples are illustrative but not limiting of the invention.

Example 1

An annular distributor having an annular slit layer and a first type guide vane as shown in FIG. 4 and a reactor having the same annular distributor were fabricated. The annular distributor and the reactor were set to meet the following dimensions.

Width of annular distributor (520): 400 mm

Height of annular distributor (510): 600 mm

Annular slit layer: single slit layer

Number of slits: 60

Width of each slit: 72.43 mm

Height of each slit: 300 mm

Starting point of first type guide vane (end of first vertical deflection plate in outer circumferential direction): 1000 mm from inner periphery to outer periphery Height of first type guide vane: 600 mm (same as that of annular distributor)

Number of first type guide vanes: 4

Shutoff plate: 1, opposite to central axis of opening

Reactor diameter: 4,150 mm

Comparative Example 1

An annular distributor and a reactor were fabricated with the same specification as Example 1 except for the first type guide vane and the shutoff plate.

Experiment 1: Measurement of Flow Rate Distribution in Annular Distributor

Figure 18:
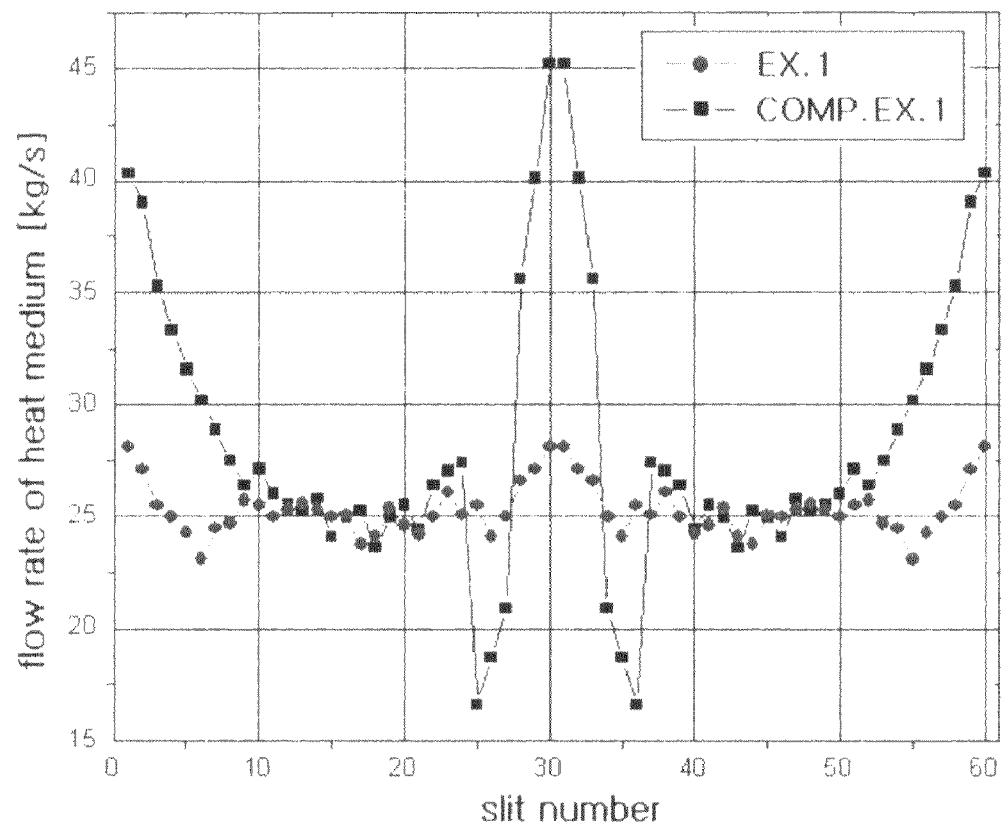
FIG. 18 is a graph illustrating flow rate distribution of a heat medium in catalytic gas phase oxidation occurring within reactors fabricated according to Example 1 and Comparative Example 1.

During catalytic gas phase oxidation in the reactors fabricated according to Example 1 and Comparative Example 1, flow rate distributions of the heat medium according to slits were measured, and the results are shown in FIG. 18.

Referring to FIG. 18, in the annular distributor equipped with the first type guide vane of the invention (Example 1), the flow rate of the heat medium was substantially uniform without significant differences according to slit positions. To the contrary, in the annular distributor without the first type guide vane (Comparative Example 1), some slits placed adjacent to a heat medium supply duct (slit nos. 25 to 36) showed a large variation in flow rate owing to internal disturbance, and other slits placed opposite to the heat medium supply duct (slit nos. 0 to 6 and 55 to 60) showed a large variation in flow rate also.

Therefore, it was observed that the annular distributor equipped with the first type guide vane of the invention (Example 1) was able to maintain uniform flow without any internal disturbance.

Example 2

An annular distributor having a slit layer and a second type guide vane as shown in FIG. 7 and a reactor having the same annular distributor were fabricated. The annular distributor and the reactor were set to meet the following dimensions.

Diameter of slit layer: 4,150 mm

Height of slit layer: 300 mm

Width of slit in slit layer: 72.43 mm

Distribution of slits in slit layer: 6° (angle defined by two adjacent slits with respect to the center of a slit layer circle)

Width of conduit of annular distributor: 400 mm

Shape of second type guide vane: triangular prism

Length of second type guide vane: 1000 mm

Comparative Example 2

An annular distributor and a reactor were fabricated with the same specification as Example 2 except for the second type guide vane.

Experiment 2: Measurement of Flow Rate Distribution in Annular Distributor

Figure 19:
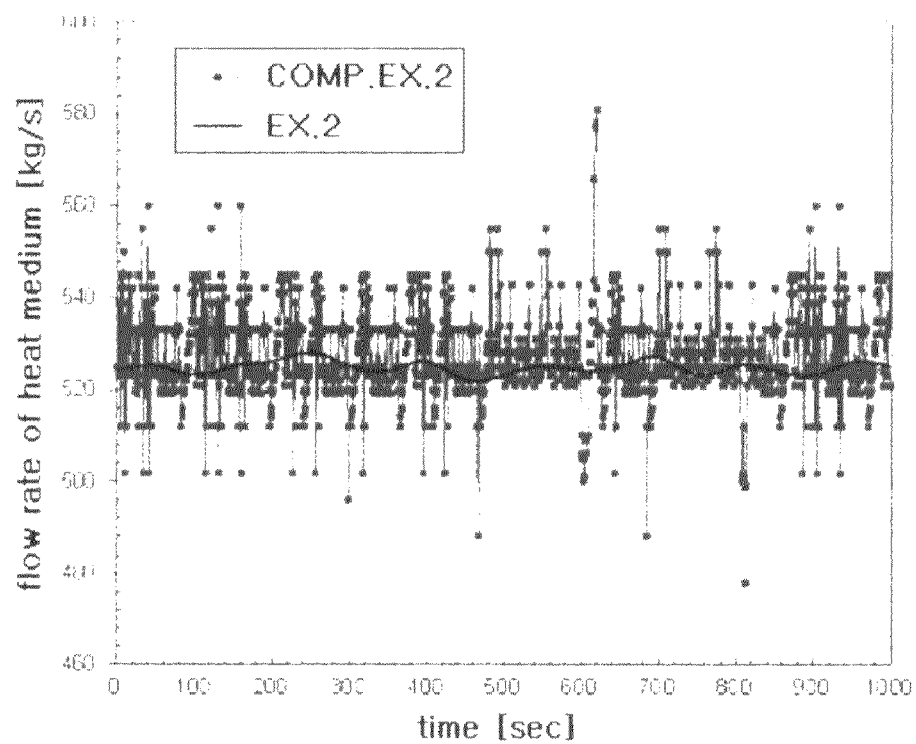
FIG. 19 is a graph illustrating flow rate variation of a fluid according to time in annular distributors fabricated according to Example 2 and Comparative Example 2, in which the flow is halved about a duct.

In the annular distributors fabricated according to Example 2 and Comparative Example 2, flow rate change of fluid halved about the duct was measured according to time, and the results were shown in FIG. 19. An ultrasonic flowmeter was used to measure the flow rate of fluid at a point C or D in FIG. 7, after the fluid was divided by the second type guide vane.

Referring to FIG. 19, in the annular distributor having the second type guide vane (Example 2), the flow rate of fluid (heat medium) flowing in one direction of the guide vane about the duct, that is, one direction 160, 161 of the annular distributor was kept steady without changing greatly according to time. On the other hand, in the annular distributor without the guide vane (Comparative Example 2), the flow rate of fluid halved about the duct changed greatly according to time. It was therefore observed that the annular distributor equipped with the second type guide vane of the invention (Example 2) was able to maintain uniform flow without any internal disturbance.

Example 3

An annular distributor having a slit layer and a third type guide vane as shown in FIGS. 11 and 14 and a reactor having the same annular distributor were fabricated. The annular distributor and the reactor were set to meet the following dimensions.

Width of annular distributor (520): 400 mm

Height of annular distributor (510): 600 mm

Width of third type guide vane: 400 mm (the same as width of annular distributor)

Position of third type guide vane: 400 mm point at height of annular distributor (i.e., lower (region A) slit layer height: 400 mm, upper (region B) slit layer height: 200 mm)

Width of slit in lower (region A) slit layer (230): 72.43 mm

Height of slit in lower (region A) slit layer (220): region a (100 mm), region b (150 mm), region c (200 mm), region d (100 to 300 mm)

Width of slit in upper (region B) slit layer (230): 72.43 mm

Height of slit in upper (region B) slit layer (220): region a (50 mm), region b (100 mm), region c (150 mm), region d (100 to 200 mm)

Distribution and number of slits in upper/lower (regions A and B) slit layers: 6° (angle defined by two adjacent slits with respect to the center of a slit layer circle) and 60 for each of upper/lower regions (region A and region B)

Diameter of reactor: 4,150 mm

Diameter of opening of first doughnut type baffle plate: 1,700 mm

Diameter of opening of additional doughnut-shaped baffle plate: 1800 mm

Height of first pass (H1) (height from bottom tube sheet 32 to first doughnut-shaped baffle plate): 1200 mm Height from bottom tube sheet 32 to additional doughnut-shaped baffle plate 21 (H2): 600 mm Height from additional doughnut-shaped baffle plate 21 to first doughnut-shaped baffle plate 20 (H3): 600 mm.

Comparative Example 3

An annular distributor which does not have the third type guide vane and a reactor having the same annular distributor were fabricated according to the following dimensions.

Width of annular distributor: 400 mm

Height of annular distributor: 600 mm

Width of slit in slit layer: 72.43 mm

Height of slit in slit layer: region a (100 mm), region b (150 mm), region c (200 mm), region d (100~300 mm)

Distribution and number of slits in slit layer: 6° (angle defined by two adjacent slits with respect to the center of a slit layer circle) and 60

Reactor diameter: 4,150 mm

Diameter of opening of first doughnut-shaped baffle plate: 1,700 mm

Height of first pass (H1): 1,200 mm

Experiment 3: Measurement of Mean Heat Transfer Coefficient Inside Reactors

Figure 20:
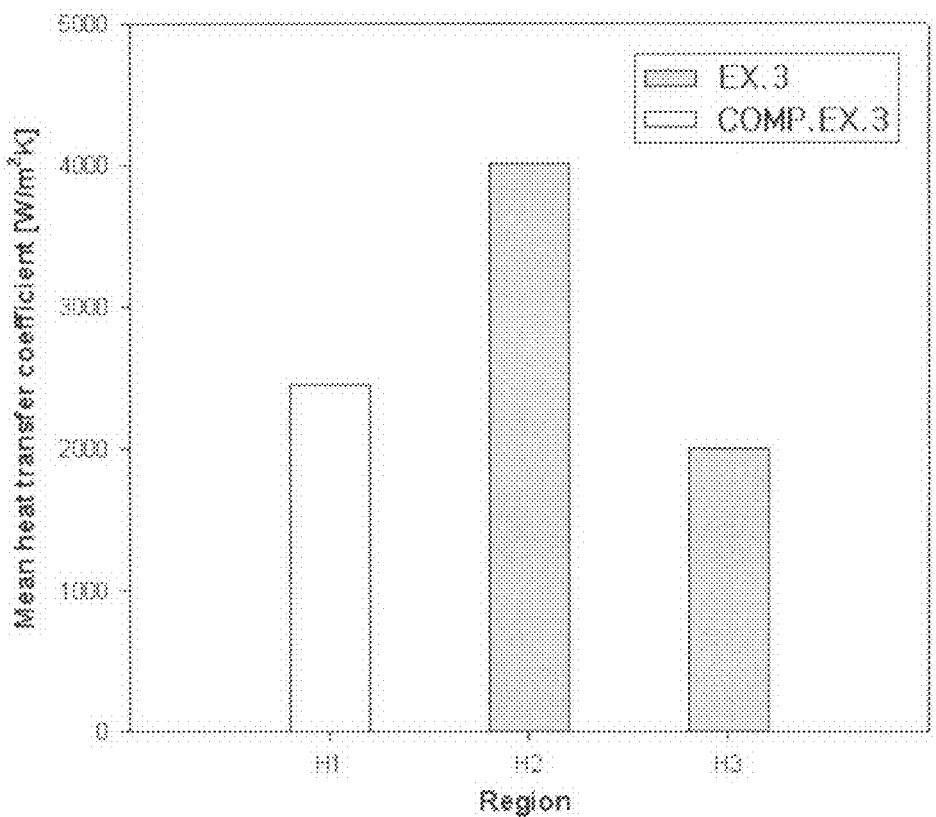
FIG. 20 is a graph comparatively illustrating an average heat transfer coefficient in catalytic gas phase oxidation occurring within reactors fabricated according to Example 3 and Comparative Example 3.

During catalytic gas phase oxidation in the reactors fabricated according to Example 3 and Comparative Example 3, average heat transfer coefficient was measured, and the result is shown in FIG. 20.

Comparative Example 3 had a heat transfer coefficient represented by one average value in the first pass.

On the other hand, in the case of Example 3, the additional doughnut-shaped baffle plate defines two passes and thus the heat transfer coefficient can be expressed by two average heat transfer coefficients. The first one is the average heat transfer coefficient at the height H2 from the bottom tube sheet 32 to the additional doughnut-shaped baffle plate, and the second one is the average heat transfer coefficient at the height H3 from the additional doughnut-shaped baffle plate to the first doughnut-shaped baffle plate. In this case, it can be understood that the average heat transfer coefficient at the height H2 from the bottom tube sheet 32 to the additional doughnut-shaped baffle plate was larger than that at the height H1 of the first pass and the average heat transfer coefficient at the height H3 from the additional doughnut-shaped baffle plate to the first doughnut-shaped baffle plate was rather smaller than that at the height H1 of the first pass.

Therefore, the heat transfer coefficient increased at the height H2 from the bottom tube sheet 32 to the additional doughnut-shaped baffle plate was able to suppress the build-up of the hot spot in this region. The heat transfer coefficient decreased at the height H3 from the additional doughnut-shaped baffle plate to the first doughnut-shaped baffle plate was also higher than minimum average heat transfer coefficient which is generally used in heat exchanger or reactor design.

Figure 21:
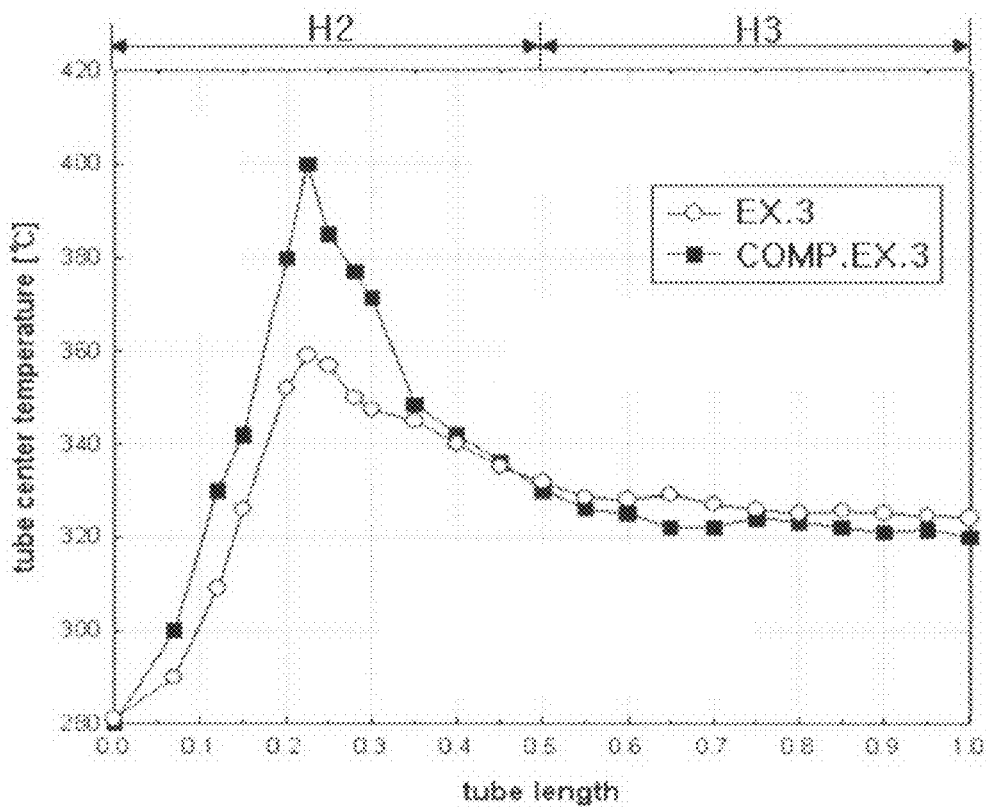
FIG. 21 is a graph comparatively illustrating an temperature distribution in catalytic gas phase oxidation occurring within reaction tubes of reactors fabricated according to Example 3 and Comparative Example 3.

Experiment 4: Measurement of Temperature Distribution Inside Reaction Tubes of Reactors During catalytic gas phase oxidation in the reactors fabricated according to Example 3 and Comparative Example 3, temperature distribution inside reaction tubes was measured, and the result is shown in FIG. 21.

In the case of Example 3, as illustrated in the measurement of average heat transfer coefficient inside the reactor shown in FIG. 20, the heat transfer coefficient at the height H3 from the additional doughnut-shaped baffle plate to the first dough-nut shaped baffle plate was decreased rather from that of Comparative Example 3. Thus, temperature was increased slightly at this height H3. However, since the heat transfer coefficient at the height H2 from the bottom tube sheet 32 to the additional doughnut-shaped baffle plate was increased more than that of Comparative Example 3, the temperature of the hot spot taking place at this height H2 was dropped significantly. Accordingly, the reactor fabricated in Example 3 was able to suppress the hot spot build-up in the region having violent reaction.

INDUSTRIAL APPLICABILITY

The annular distributor of the invention can introduce or discharge fluid such as a heat medium with a uniform and small flow rate at several circumferential positions in the annular distributor, thereby improving flow rate distribution. Accordingly, this can prevent internal disturbance by fluid flow in an apparatus (e.g., a multitubular catalytic reactor or heat exchanger), which receives or discharges fluid through the annular distributor, while making fluid in the apparatus have uniform temperature distribution. Furthermore, it is possible to suppress hot spots from developing in the reactor.

In addition, the annular distributor having a third type guide vane of the invention can adjust the amount of fluid entering/exiting the reactor or heat exchanger according to axial positions and apply different flow rates according to axial positions even in one pass determined by a baffle structure in the reactor in order to concentrate fluid flow to a hot spot where a reaction is violent, thereby suppressing localized temperature rise.

Accordingly, the reactor having the annular distributor structure of the invention can produce (meta) acrylic acid and/or (metal) acrolein by catalytic gas phase oxidation of gases including propylene or isobutylene with an improved yield by more stable operation and lower energy, thereby prolonging the lifespan of catalyst.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

What is claimed is:

1. An annular distributor comprising:
an annular slit layer that is mounted on an inner circumferential surface of the annular distributor and has at least one slit discharging or introducing a fluid;
at least one opening that is formed on an outer circumferential surface of the annular distributor and is connected with any one of a fluid supply duct and a fluid discharge duct; and
at least one guide vane selected from three types of guide vanes that are installed in the annular distributor, and splits a flow rate of the fluid supplied from the duct or collects a flow rate of the fluid discharged to the duct,
wherein, among the three types of guide vanes,
the first type guide vane is two or more in number, is installed in a longitudinal direction, and includes (i) a first vertical deflection plate that is spaced apart from the slit layer and is located between the slit layer and the opening and (ii) a second vertical deflection plate that is not coaxial with the first vertical deflection plate and is connected with both an inner end of the first vertical deflection plate and the slit layer;
the second type guide vane is installed in a longitudinal direction along an extension line of the diameter of a circle formed by the inner circumferential surface of the annular distributor, and is connected from one point between the slit layer and the opening to the slit layer; and
the third type guide vane is installed in a transverse direction along the inside of the annular distributor, and is connected with the slit layer and the outer circumferential surface of the annular distributor,
wherein at least one of the first vertical deflection plate of the first type guide vane, the second type guide vane, and the third type guide vane is extended out of the opening.

2. The annular distributor according to claim 1, wherein the opening is connected with the fluid supply duct or the fluid discharge duct.

3. The annular distributor according to claim 1, further comprising a shutoff plate installed longitudinally inside the annular distributor with a dimension the same as a longitudinal section of the annular distributor to shut off fluid flow,
wherein if the opening comprises a single one, the shutoff plate is installed opposite to a central axis of the opening, and if the opening comprises at least two, the shutoff plate is installed at ½ position of an angle defined by a center of a circle of the slit layer and central axes of two adjacent ones of the openings.

4. The annular distributor according to claim 1, wherein a length from the slit layer to an end of the first vertical deflection plate of the first type guide vane in an outer circumferential direction is at least one time of a width of the annular distributor.

5. The annular distributor according to claim 1, wherein the first vertical deflection plate of the first type guide vane is parallel to a central axis of the opening.

6. The annular distributor according to claim 1, wherein the second vertical deflection plate of the first type guide vane include:
 (a) an arc shaped first base part connected to an end of the first deflection plate toward the slit layer and separated from the slit layer; and
 (b) a second base part connected to an end of the first base, which is not connected to the first vertical deflection plate, and connected to a point on the slit layer.

7. The annular distributor according to claim 1, wherein the first type guide vane comprises a plurality of guide vanes divided into two sides about a central axis of each of the openings, the guide vane(s) at one side is symmetric to the guide vane(s) at the other side.

8. The annular distributor according to claim 1, wherein the first type guide vane comprises multiple guide vanes, in which 2n number of the guide vanes are independently installed to each of the openings, where n is an integer of 1 or more.

9. The annular distributor according to claim 1, wherein the first type guide vane comprises multiple guide vanes, in which 2n guide vanes are independently installed to each opening (here, n is an integer of 1 or more), and thus among the multiple guide vanes installed to each opening, the guide vane located on the outermost side on the basis of the center of the circle formed by the first base part of each guide vane is called a first guide vane, and then the other guide vanes are called a second guide vane, a third guide vane, . . . , an $m^{th}$ guide vane, which are sequentially located toward the center of the circle (here, m is an integer of 2 or more),
 a difference ($R_{out}-R_1$) between a radius ($R_{out}$) of the outer circumferential surface of the annular distributor and a radius ($R_1$) of the circle formed by the first base part of the first guide vane, a difference ($R_1-R_2$) between a radius ($R_1$) of the circle formed by the first base part of the first guide vane and a radius ($R_2$) of the circle formed by the first base part of the second guide vane, . . . , a difference ($R_{m-1}-R_m$) between a radius ($R_{m-1}$) of the circle formed by the first base part of the $(m-1)^{th}$ guide vane and a radius ($R_m$) of the circle formed by the first base part of the $m^{th}$ guide vane each are within a range between 200 mm and 700 mm, or within a range between 5% and 20% of a radius ($R_{in}$) of the inner circumferential surface of the annular distributor.

10. The annular distributor according to claim 1, wherein the second type guide vane is installed along a diameter direction of an inlet or outlet section of the duct.

11. The annular distributor according to claim 1, wherein the second type guide vane has a shape selected from the group consisting of triangular prism, quadrangular prism, oval column, semi-oval column, semicircular column, criss-cross prism and plate shape.

12. The annular distributor according to claim 1, wherein a length of the second type guide vane extending from an inner circumferential surface to an end toward the outer circumferential surface is 0.5 or more of a width of the annular distributor.

13. The annular distributor according to claim 1, wherein the third type guide vane divides the annular distributor into at least two regions each of which is independently adjusted in dimension and position of the slits existing on the slit layer.

14. The annular distributor according to claim 1, wherein the third type guide vane divides the annular distributor into at least two regions which share the slits existing on the slit layer.

15. The annular distributor according to claim 1, wherein the slit existing on the slit layer has a height adjusted to one selected from the group consisting of:
 a range of 100 to 1,000 mm;
 10 to 70% range with respect to a height of the annular distributor; and
 10 to 70% range with respect to a height of each region of the annular distributor divided by the third type guide vane.

16. A reactor or heat exchanger comprising the annular distributor defined by the preceding claim 1.

17. The reactor or heat exchanger according to claim 16, further comprising a doughnut-shaped baffle plate installed inside the reactor or heat exchanger corresponding to a position inside the annular distributor where the third type guide vane is installed.

18. The reactor or heat exchanger according to claim 16, wherein the annular distributor is arranged in a position inside the reactor or heat reactor where a hot spot is expected to develop.

19. The reactor or heat exchanger according to claim 18, wherein the annular distributor is arranged in such a fashion that a region having a total of slit sizes, the flow rate of which are adjusted by a largest amount, of regions inside the annular distributor divided by the third type guide vane corresponds to the position of the hot spot in the reactor.

20. A method of producing unsaturated aldehyde or unsaturated acid from olefin by catalytic gas phase oxidation in the reactor as defined in claim 16.

* * * * *